US012344050B2

(12) United States Patent
Torregrossa et al.

(10) Patent No.: US 12,344,050 B2
(45) Date of Patent: Jul. 1, 2025

(54) METHOD AND SYSTEM FOR DETECTING SWAPPED TIRES ON A VEHICLE

(71) Applicant: The Goodyear Tire & Rubber Company, Akron, OH (US)

(72) Inventors: Dario Torregrossa, Luxemboug Ville (LU); Oliviero Trufffo, Imbringen (LU); Peter Jung-Min Suh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 135 days.

(21) Appl. No.: 18/508,597

(22) Filed: Nov. 14, 2023

(65) Prior Publication Data

US 2024/0190185 A1    Jun. 13, 2024

Related U.S. Application Data

(60) Provisional application No. 63/386,678, filed on Dec. 9, 2022.

(51) Int. Cl.
*B60C 23/04* (2006.01)
(52) U.S. Cl.
CPC ...... *B60C 23/0416* (2013.01); *B60C 23/0437* (2013.01)
(58) Field of Classification Search
CPC .................. B60C 23/0416; B60C 23/0437
USPC ........................................................ 340/447
See application file for complete search history.

(56) References Cited

U.S. PATENT DOCUMENTS

| | | | |
|---|---|---|---|
| 4,157,530 A | 6/1979 | Merz | |
| 4,361,202 A | 11/1982 | Minovitch | |
| 4,936,138 A | 6/1990 | Cushman et al. | |
| 6,434,399 B1 | 8/2002 | Kamperschroer | |
| 6,463,798 B2 | 10/2002 | Niekerk et al. | |
| 6,489,888 B1 | 12/2002 | Honeck et al. | |
| 6,725,712 B1 | 4/2004 | King et al. | |
| 6,750,761 B1 | 6/2004 | Newman | |
| 6,879,252 B2 | 4/2005 | Dezorzi et al. | |
| 6,882,270 B2 * | 4/2005 | Stewart ............... B60C 23/0416 340/447 |

(Continued)

FOREIGN PATENT DOCUMENTS

| | | |
|---|---|---|
| EP | 0494763 B1 | 5/1996 |
| EP | 2586633 A1 | 5/2013 |

(Continued)

OTHER PUBLICATIONS

Bonnie et al., Method and Device for determining the position of pressure sensors in a tire pressure monitoring system, Clarivate Analytics, 2008, 49 pages, 2008.

(Continued)

*Primary Examiner* — Eric Blount
(74) *Attorney, Agent, or Firm* — Edward T. Kennedy (57) ABSTRACT

The invention provides a method and system for automatically detecting a swap of tires on a vehicle using RSSI levels obtained from tires equipped with transmitters. The obtained RSSI level distributions are used to artificially generate a set of training records, allowing for robust training of a machine learning algorithm. The machine learning algorithm is thereby enabled to provide efficient detection of tire swaps, and to generate a corresponding output signal.

20 Claims, 4 Drawing Sheets

(56) References Cited

U.S. PATENT DOCUMENTS

| | | |
|---|---|---|
| 6,885,282 B2 | 4/2005 | Desai et al. |
| 6,885,296 B2 | 4/2005 | Hardman et al. |
| 6,941,803 B2 | 9/2005 | Hirohama et al. |
| 6,952,160 B1 | 10/2005 | Bennie et al. |
| 7,010,968 B2 | 3/2006 | Stewart et al. |
| 7,131,323 B2 | 11/2006 | Hirota |
| 7,177,739 B2 | 2/2007 | Kuchler |
| 7,355,509 B2 | 4/2008 | Rennie et al. |
| 7,367,227 B2 | 5/2008 | Stewart et al. |
| 7,385,485 B2 | 6/2008 | Thomas et al. |
| 7,423,532 B2 | 9/2008 | Stewart et al. |
| 7,425,892 B2 | 9/2008 | Mori et al. |
| 7,506,540 B1 | 3/2009 | Job |
| 7,750,798 B2 | 7/2010 | Mori |
| 7,839,273 B2 | 11/2010 | Tabe |
| 7,948,364 B2 | 5/2011 | Lin et al. |
| 8,188,848 B2 | 5/2012 | Lange et al. |
| 8,204,645 B2 | 6/2012 | Weston |
| 8,217,776 B2 | 7/2012 | Hyde |
| 8,332,103 B2 | 12/2012 | Greer et al. |
| 8,380,460 B2 | 2/2013 | Miller et al. |
| 8,396,629 B1 | 3/2013 | Kim et al. |
| 8,498,785 B2 | 7/2013 | Juzswik |
| 8,577,643 B2 | 11/2013 | Kuchler |
| 8,584,517 B2 | 11/2013 | Strahan |
| 8,626,413 B2 | 1/2014 | Kammann |
| 8,659,411 B2 | 2/2014 | Fink |
| 8,843,267 B2 | 9/2014 | Park et al. |
| 9,162,542 B2 * | 10/2015 | Shima ................. B60C 23/0416 |
| 9,180,742 B2 | 11/2015 | Kosugi et al. |
| 9,259,978 B2 | 2/2016 | Patel et al. |
| 9,278,589 B2 * | 3/2016 | Laifenfeld .......... B60C 23/0437 |
| 9,399,376 B2 | 7/2016 | Lickfelt et al. |
| 9,440,501 B2 | 9/2016 | Huang et al. |
| 9,463,673 B2 | 10/2016 | Huang et al. |
| 9,469,166 B2 | 10/2016 | Mcintyre et al. |
| 9,584,881 B2 | 2/2017 | Taki |
| 9,769,305 B2 | 9/2017 | Banerjee et al. |
| 9,783,011 B2 | 10/2017 | Taki |
| 9,802,447 B2 | 10/2017 | Petrucelli |
| 9,851,227 B2 | 12/2017 | Lammers |
| 9,937,759 B2 | 4/2018 | Terada et al. |
| 9,950,577 B1 | 4/2018 | Marlett et al. |
| 9,973,831 B2 | 5/2018 | Mejegård et al. |
| 10,006,799 B2 | 6/2018 | Hanson et al. |
| 10,075,819 B2 | 9/2018 | Santavicca et al. |
| 10,081,317 B2 | 9/2018 | Naboulsi |
| 10,082,381 B2 | 9/2018 | McMillen |
| 10,093,138 B2 | 10/2018 | Decia et al. |
| 10,131,320 B2 | 11/2018 | Schmotzer et al. |
| 10,132,719 B2 | 11/2018 | Fudulea |
| 10,237,690 B2 | 3/2019 | Thakur et al. |
| 10,442,253 B2 | 10/2019 | Werner et al. |
| 10,479,300 B2 | 11/2019 | Wheeler et al. |
| 10,549,587 B2 | 2/2020 | Kollmitzer et al. |
| 10,685,510 B2 | 6/2020 | Linsmeier et al. |
| 10,726,714 B2 | 7/2020 | Sekizawa et al. |
| 10,780,749 B2 | 9/2020 | Hassani et al. |
| 2002/0092345 A1 | 7/2002 | Van et al. |
| 2005/0179530 A1 | 8/2005 | Stewart et al. |
| 2008/0143507 A1 | 6/2008 | Cotton et al. |
| 2008/0150712 A1 | 6/2008 | Cooprider et al. |
| 2009/0002146 A1 | 1/2009 | Lin |
| 2009/0066498 A1 | 3/2009 | Jongsma et al. |
| 2009/0299570 A1 | 12/2009 | Kammann |
| 2010/0063669 A1 | 3/2010 | Fink et al. |
| 2011/0071737 A1 | 3/2011 | Greer et al. |
| 2011/0282548 A1 | 11/2011 | Haas |
| 2012/0133498 A1 | 5/2012 | Nah et al. |
| 2014/0002257 A1 | 1/2014 | Han et al. |
| 2014/0379231 A1 | 12/2014 | Hawes et al. |
| 2016/0039365 A1 | 2/2016 | Vanderwall |
| 2016/0129736 A1 | 5/2016 | Peine et al. |
| 2017/0106706 A1 | 4/2017 | Bettecken et al. |
| 2017/0174014 A1 | 6/2017 | Stewart et al. |
| 2018/0074490 A1 | 3/2018 | Park |
| 2019/0126694 A1 | 5/2019 | Stewart et al. |
| 2019/0244301 A1 | 8/2019 | Seth et al. |
| 2020/0101802 A1 | 4/2020 | Nasser et al. |
| 2020/0346500 A1 | 11/2020 | Zeng et al. |
| 2020/0369100 A1 | 11/2020 | Pierre et al. |
| 2020/0398617 A1 | 12/2020 | Kandler et al. |
| 2021/0170812 A1 * | 6/2021 | Chen .................. B60C 23/0488 |
| 2021/0181064 A1 | 6/2021 | Kelley et al. |
| 2022/0176968 A1 | 6/2022 | Brooks |
| 2022/0230481 A1 | 7/2022 | Singh et al. |
| 2023/0333200 A1 | 10/2023 | Guinart |

FOREIGN PATENT DOCUMENTS

| | | |
|---|---|---|
| WO | 2002057097 A3 | 7/2002 |
| WO | 2006100577 A1 | 9/2006 |
| WO | 2006104484 A1 | 10/2006 |
| WO | 2008116683 A1 | 10/2008 |
| WO | 2013139977 A1 | 9/2013 |
| WO | 2017018700 A1 | 2/2017 |
| WO | 2019092052 A1 | 5/2019 |
| WO | 2019243374 A1 | 12/2019 |
| WO | 2020053901 A1 | 3/2020 |
| WO | 2020123812 A1 | 6/2020 |

OTHER PUBLICATIONS

Search Report for European application No. EP 23214450 dated Apr. 12, 2024.

* cited by examiner

METHOD AND SYSTEM FOR DETECTING SWAPPED TIRES ON A VEHICLE

FIELD OF THE INVENTION

The invention relates generally to a method and a system for detecting swapped tires on a vehicle and, more particularly, to a method and a system that uses signal strength indicators of signals received from tire-mounted transmitters at a control unit, in order to detect when tires on a vehicle have been swapped.

BACKGROUND OF THE INVENTION

Tires for automotive vehicles are nowadays equipped with sensor units, such as for example pressure sensors that are attached to an innerliner of the tire. The sensors measure a parameter of the tire, such as its inflation pressure, and communicate the measured value wirelessly to a telematics control unit of the vehicle. This control unit receives signals carrying the measured value from each of the vehicle's tires and is configured to monitor all sensed parameters, raise alerts if predetermined operating values of the parameters are exceeded, to notify the driver, or to send maintenance alerts to a vehicle fleet operator.

The correct identification of a tire's position on the vehicle is crucial for these tire related services. If tires are swapped during a maintenance operation, and the new positions on the vehicle are not properly registered at the control unit, this may lead to erroneous notifications, as the data gathered over time from a given position will correspond to different tires, but will be attributed to the same registered tire by the control unit.

In large fleets, for example fleets of multi-axle transport vehicles, the number of tire swaps is large. It is therefore important to reliably identify tire swaps, in order for the related notification services to provide reliable data to the fleet's owner of the tire's state.

In U.S. Pat. No. 9,278,589 B2, it has been proposed to compare the signal strength of a signal that is received from a tire at a control unit, to a previously recorded signal strength, which is referred to as training data, in order to detect a change of position of the tire. However, the document remains silent as to how to obtain sufficient training data in practice, which is particularly problematic for multi-axle vehicles due to the large number of tires, and thus the large number of possible tire swaps that one should be able to detect.

There remains a need to provide a reliable automatic detection system of a tire swap or exchange on vehicles, which remains robust independently of the number of the vehicle's axles, and which does not require dedicated transmissions from the tire's sensors for the purpose of detecting a tire swap, as theses sensor rely on limited battery capacity.

SUMMARY OF THE INVENTION

The invention relates to a method in accordance with claim 1, to a system in accordance with claim 10 and to a control unit in accordance with claim 16.

Dependent claims refer to preferred embodiments of the invention.

In accordance with an aspect of the invention, a computer-implemented method for detecting a swap of tires on a vehicle including a set of tires mounted in a plurality of available mounting positions of the vehicle is provided. Each tire is equipped with a signal transmitter. The method comprises the steps of:

recording a set of initial mounting positions of the tires in a first memory element of a control unit of the vehicle;

providing initial signal signature data in a second memory element of the control unit, wherein the initial signal signature data is obtained by receiving, at a signal receiver of the vehicle, signals from the signal transmitters while the tires are mounted at their respective initial mounting positions;

training a machine learning algorithm of the control unit using a training data set, so that the trained machine learning algorithm is enabled to classify input signal signature data, obtained by receiving signals from the signal transmitters of the tires, as either corresponding to the initial signal signature data, or not;

obtaining input signal signature data at the signal receiver of the vehicle and classifying the input signal signature data using the trained machine learning algorithm, and generating a tire swap detection signal at the control unit if the input signal signature data is classified as not corresponding to the initial signal signature data;

The training data set comprises matched records, in which the initial signal signature data is associated with the set of corresponding initial mounting positions, and mismatched records, which are generated by a processor by associating the initial signal signature data with a plurality of sets of mounting positions that differ from the set of initial mounting positions. The use of a training data set with matched records and with mismatched records may be referred to as virtualization.

Preferably, obtaining the initial signal signature data may comprise obtaining statistics of received signal strength indicator (RSSI) levels for each of the received signals over time, while the tires are mounted at their respective initial mounting positions. The input signal signature data may preferably comprise statistics of RSSI levels for the signals received from the signal transmitters of the tires.

The statistics of RSSI levels may preferably be provided by a set of parameters describing a respectively corresponding RSSI level distribution.

Preferably, the step of training a machine learning algorithm may comprise a preliminary step of selecting a machine learning algorithm from a set of candidate machine learning algorithms, wherein a genetic algorithm selects a candidate machine learning algorithm based on the accuracy it provides in correctly classifying signal signature data.

It may further be preferred that the trained machine learning algorithm provides a probability between 0 and 1, wherein the extreme values correspond to the input signal signature data being accurately classified as corresponding to the initial signal signature data, or not.

The tire swap detection signal may preferably indicate a tire swap if the probability of the input signal signature data being accurately classified as not corresponding to the initial signal signature data is above a predetermined threshold value.

Preferably, more input signal signature data may be obtained and classified if the probability of available input signal signature data being accurately classified as not corresponding to the initial signal signature data is below a predetermined threshold value.

The tire swap detection signal may preferably indicate a tire swap if input signal signature data obtained during a predetermined amount of time is repeatedly classified as not corresponding to the initial signal signature data.

It may be preferred that the available mounting positions of the vehicle correspond to positions of axles of the vehicle.

In accordance with a further aspect of the invention, a tire swap detection system is proposed. The tire swap detection system comprises a control unit and a set of tires mounted in a plurality of available mounting positions of a vehicle, each tire being equipped with a signal transmitter. The control unit comprises a signal receiver for receiving signals from the signal transmitters, a first memory element for storing initial mounting positions of the tires and a second memory element for storing initial signal signature data, the initial signal signature data having been obtained by receiving, at the signal receiver, signals from the signal transmitters while the tires are mounted at their respective initial mounting positions. The control unit further comprises a trained machine learning algorithm configured to classify input signal signature data, obtained by receiving signals from the signal transmitters of the tires, as either corresponding to the initial signal signature data or not, and the control unit is further configured to generate a tire swap detection signal if input signature data is classified as not corresponding to the initial signal signature data.

Preferably, the machine learning algorithm may have been trained using a training data set comprising matched records, in which the initial signal signature data is associated with the set of corresponding initial mounting positions, and mismatched records, which are generated by a processor by associating the initial signal signature data with a plurality of sets of mounting positions that differ from the set of initial mounting positions.

The control unit may preferably be arranged halfway between a front and a rear axle of the vehicle.

Alternatively, the control unit may be arranged closer to either one of the front or rear axles of the vehicle.

Preferably, the control unit may be arranged on a longitudinal middle axis of the vehicle.

In accordance with a further aspect of the invention, a control unit for a vehicle is proposed. The control unit is configured to generate a tire swap detection signal. It comprises a signal receiver for receiving signals from signal transmitters of tires, a first memory element for storing initial mounting positions of the tires on the vehicle and a second memory element for storing initial signal signature data, the initial signal signature data having been obtained by receiving, at the signal receiver, signals from the signal transmitters while the tires are mounted at their respective initial mounting positions on the vehicle. The control unit further comprises a trained machine learning algorithm configured to classify input signal signature data, obtained by receiving signals from the signal transmitters of the tires, as either corresponding to the initial signal signature data or not. The control unit is further configured to generate a tire swap detection signal if input signature data is classified as not corresponding to the initial signal signature data.

Preferably, the initial signal signature data may be obtained by generating, at the control unit, statistics of received signal strength indicator (RSSI) levels for each of the received signals over time, while the tires are mounted at their respective initial mounting positions, and wherein the input signal signature data comprises statistics of RSSI levels for the signals received from the signal transmitters of the tires.

The control unit may preferably further comprise a processor configured to select a machine learning algorithm from a set of candidate machine learning algorithms, wherein a genetic algorithm selects a candidate machine learning algorithm based on the accuracy it provides in correctly classifying signal signature data.

Definitions

"RSSI" means Received Signal Strength Indicator. It is a measurement of the power present in a received radio signal, independently of the information comprised in the signal.

"Longitudinal" is used to designate the main back-to-forth axis of a vehicle.

"Signal transmitter" is used to designate any transmitter or sensor of a tire, which is capable of transmitting radio signals to a control unit of a vehicle.

"Machine learning algorithm" designates a class of algorithms for automatically classifying data. This may include an artificial neural network, in which several layers of nodes, each performing detection routines on the input signal, are interconnected in order to provide an output signal, which identifies a predetermined class to which the input signal belongs.

"Training data" designates data that is representative of the classes that the machine learning algorithm should classify. The training data comprises labelled data records, wherein each record is a priori known and labelled to belong to a given class.

"Training" a machine learning algorithm means using the training data to tune parameters of the machine learning algorithm (for example parameters of the nodes of a generic artificial neural network), thereby enabling the machine learning algorithm to accurately classify an unknown input signal once the training phase has been completed. During the training phase, a subset of the available training data called validation data is used as test input, in order to make sure that the machine learning algorithm operates as desired.

"Genetic algorithm" designates an optimization algorithm for solving both constrained and unconstrained optimization problems. A genetic algorithm is based on the principle of natural selection, the process that drives biological evolution. The genetic algorithm repeatedly modifies a population of candidate solutions. At each step, the genetic algorithm selects individuals from the current population to be "parents" by determining whether the corresponding solution, applied to the problem at hand, improves on previously determined solutions. The selected parents are used to produce the "children" for the next generation. The children candidate solutions inherit the properties, or parameters, of their parents, with a limited number of random modifications. Over successive generations, the population of candidate solutions to the optimization problem "evolves" toward a close-to-optimal solution.

BRIEF DESCRIPTION OF THE DRAWINGS

The invention will be described by way of example and with reference to the accompanying drawings in which.

DETAILED DESCRIPTION OF THE INVENTION

With reference of FIG. 1 through 6, an exemplary embodiment of the tire swap detection system of the present invention is indicated at 1000. The tire swap detection system 1000 and accompanying method attempts to overcome challenges posed by prior art methods.

Figure 1:
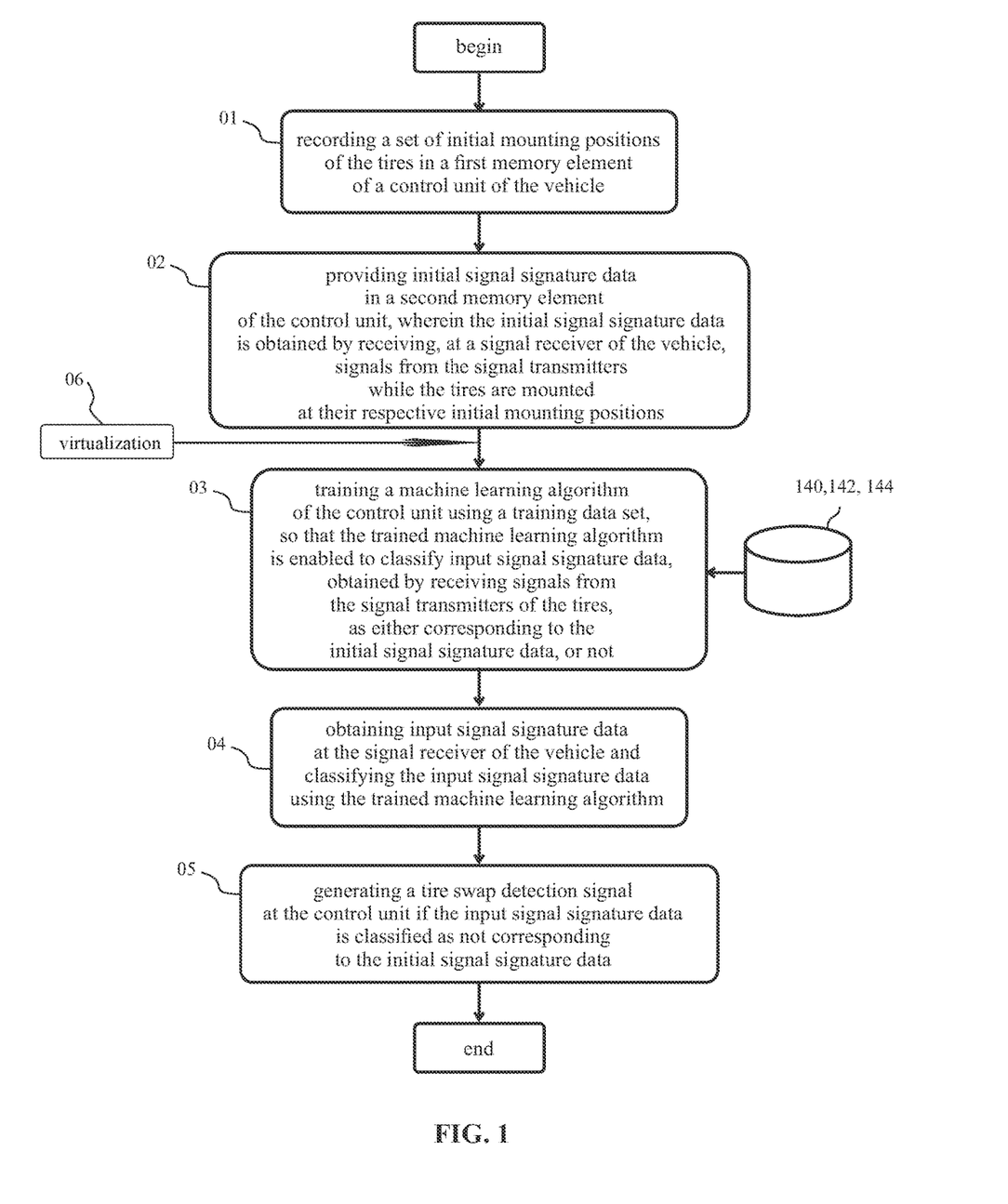
FIG. 1 is a workflow illustrating the main steps of an embodiment of the method in accordance with the present invention.
Figure 2:
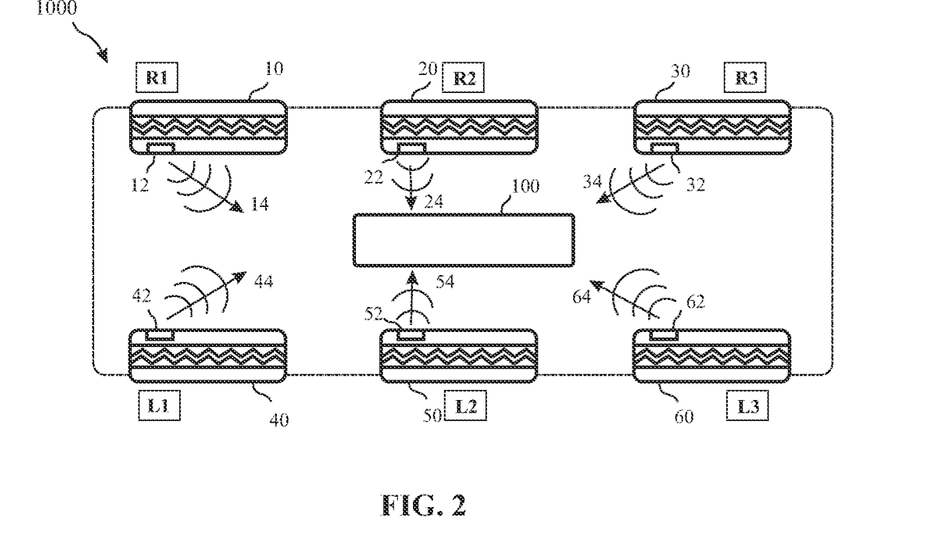
FIG. 2 is a schematic diagram showing aspects of an embodiment of the tire swap detection system in accordance with the present invention.

FIG. 1 provides an overview of the main steps of the proposed swap detection method, while FIG. 2 shows corresponding structure in the proposed swap detection system.

It is proposed to use a machine learning algorithm, such as an artificial neural network as they are generically well-known in the art, to detect a swap of tires on a vehicle. In order to turn the generic machine learning algorithm into a specialized algorithm that is able to accurately classify an observed signal as either belonging to the class "swapped tire detected" or to the class "no swapped tire detected".

The tires 10, 20, 30, 40, 50, 60 of a vehicle are equipped with at least one sensor 12, 22, 32, 42, 52, 62 that communicates a parameter 14, 24, 34, 44, 54, 64 of the tire, such as an inflation pressure, to a control unit 100 of the vehicle using a wireless data communication channel. It is proposed to use a Received Signal Strength Indicator, RSSI, which is readily available at the receiving control unit 100, to characterize each signal transmission 14, 24, 34, 44, 54, 64 from a given tire 10, 20, 30, 40, 50, 60, independently of the information that is carried by the received signal. Only the distributions of RSSI levels for each received signal are used. Signals received from each tire position have different RSSI level distributions owing to their differing distances to the control unit receiving the signals, owing to the noise inflicted by their individual radio environments and owing to intrinsic features of the respective transmitters. In order to efficiently train a generic machine learning algorithm so that it becomes able to perform a specific classification task, a large number of training data relating to both classes that need to be detected is required.

It is not easily derived from previously know methods how a large volume of RSSI data corresponding to a situation in which tires have been swapped should be obtained. A control unit 100 typically registers an initially known set of tires 10, 20, 30, 40, 50, 60 to a set of initially known positions R1, R2, R3, L1, L2, L3 respectively. If no tires are swapped, this information remains correctly registered at the control unit. However, if tires are swapped without notifying the control unit, a mismatch between the recorded positions at the control unit, and the actual positions of tires occurs, so that the control unit is no longer able to accurately attribute a signal received from one of the available positions R1, R2, R3, L1, L2, L3 to a tire actually mounted at that position.

It has been observed that a similar mismatch can be simulated by leaving the tires 10-60 in their respective actual positions R1-L3, and by modifying the recorded positions of the tires at the control unit instead. As will be explained below, this observation allows to artificially and automatically generate a large number of labelled training data records corresponding to the class of "swapped tire detected", which is used to efficiently train the machine learning algorithm.

Figure 3:
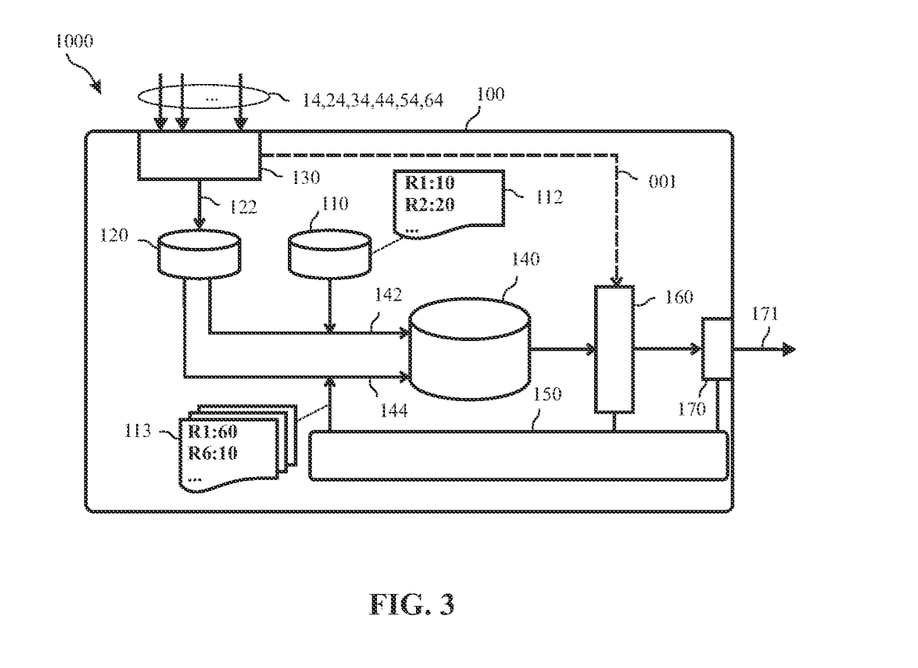
FIG. 3 is a schematic diagram showing detailed aspects of an embodiment of the tire swap detection system shown in FIG. 2.

FIG. 3 provides a more detailed view of the control unit 100 shown in FIG. 2. While the vehicle shown in FIG. 2 has six tires distributed on three axles, this is for the purpose of illustration only, and the proposed method straightforwardly applies to different pluralities of tire position and/or vehicle axles.

At a first step 01, the set of initial mounting positions R1, R2, R3, L1, L2, L3 of the vehicle's tires 10, 20, 30, 40, 50, 60 is recorded 112 in a first memory element 110 of the control unit 100. The memory element may for example comprise solid state memory capacity or any other memory element known in the art.

Initial signal signature data 122 is recorded in a second memory element 120 of the control unit 100 during a further method step 02. The initial signal signature 122 data is obtained by receiving, at a signal receiver 130 of the vehicle, the signals 14, 24, 34, 44, 54, 64 from the signal transmitters 12, 22, 32, 42, 52, 62 while the tires 10, 20, 30, 40, 50, 60 are mounted at their respective initial mounting positions R1, R2, R3, L1, L2, L3. As such, the obtained initial signal signature data 112 corresponds to the correctly matched configuration of the tires versus their respective actual mounting positions. By obtaining a large number of signal transmissions 14-64 over time, for example during several weeks or months from the accurate initial mounting positions R1-L3, a large data set 122 is obtained in memory element 120. By matching this data set 122 to the known accurate initial positions of the tires 112 stored in memory element 110, matched data records 142 are made available to a training data set 140.

A processor 150 further generates mismatched records 144, in which data from the large data set 122 is purposefully mismatched to tire positions 113 that do not correspond to the accurate actual positions of the tires. For example, the mismatched tire positions 113 may record tire 60 in position R1 and tire 10 in positions L3, while other positions remain unchanged. The signal signature data 122 obtained from position R1 and recorded in the memory element 120 was actually transmitted from tire 10, while the corresponding data obtained from position L3 was transmitted from tire 60, so that mismatching the artificially generated tire positions 113 to the initial signal signature data simulates data obtained following a simulated swap of tires 10 and 60 respectively. Such resulting mismatched records 144 are made available to the training data set 140. Ideally, all available permutations of tire positions 113 are generated by the processor 150 and combined with the initial signal signature data 122 in order to generate a large number of mismatched records 144. The more accurate initial signature data 122 becomes available, the more corresponding mismatched records 144 may also be generated.

The training data set 140 therefore comprises a large number of training records 142 that correspond to the class "no swapped tire detected" and a large number of training records 144 that correspond to the class "swapped tire detected", even though no actual swap may have occurred as yet.

Virtualization, which is the use of matched data records 142 and mismatched records 144 in the training data set 140, is indicated at step 06 in FIG. 3.

During step 03, a machine learning algorithm 160 run by the processor 150 of the control unit 100 is trained using this training data set 140, so that the trained machine learning algorithm 160 is enabled to classify input signal signature data 001, obtained by receiving signals from the signal transmitters of the tires (while the tires are either in their recorded positions, or not), as either corresponding to the initial signal signature data 122, or not.

During step 04, once the machine learning algorithm 140 has been specialized through training, yet unclassified input signal signature data 001 is obtained at the signal receiver 130 and classified using the trained machine learning algorithm 140.

If the input signal signature data 001 is classified as not corresponding to the initial signal signature data 122, i.e., it is classified by the trained machine learning algorithm 140 as belonging to class "swapped tire detected", a tire swap detection signal 171 is generated at the control unit 100 at step 05. The signal 171 is preferably transmitted on a vehicle communication bus by a transmitter 170 for further processing and/or communication to the vehicle fleet owner.

The initial signal signature data 122 and the input signal signature data 001 are preferably obtained by gathering, from the signal receiver 130, RSSI levels for each of the received signals over time. This results in a statistical distribution of RSSI levels for signals received from each available mounting position, with increased accuracy as the number of received signals increases over time.

The RSSI level distribution making up the signal signatures 112,001 may for example be stored using a set of seven parameters each, specifying for example the count of received signals from a given position, the corresponding mean RSSI level, and corresponding quantile values corresponding to 10, 25, 50, 75 and 90 percent of the corresponding RSSI levels. Preferably, the received signals are cleaned by eliminating those signals that were obtained while the vehicle was at rest from the measurements.

While other representations of RSSI level distributions are not excluded by the current invention, by limiting the number of parameters per signal signature to seven, a limited number of learning parameters is fed into the machine learning algorithm 160 during training, which therefore requires a limited amount of processing power and energy.

Figure 4:
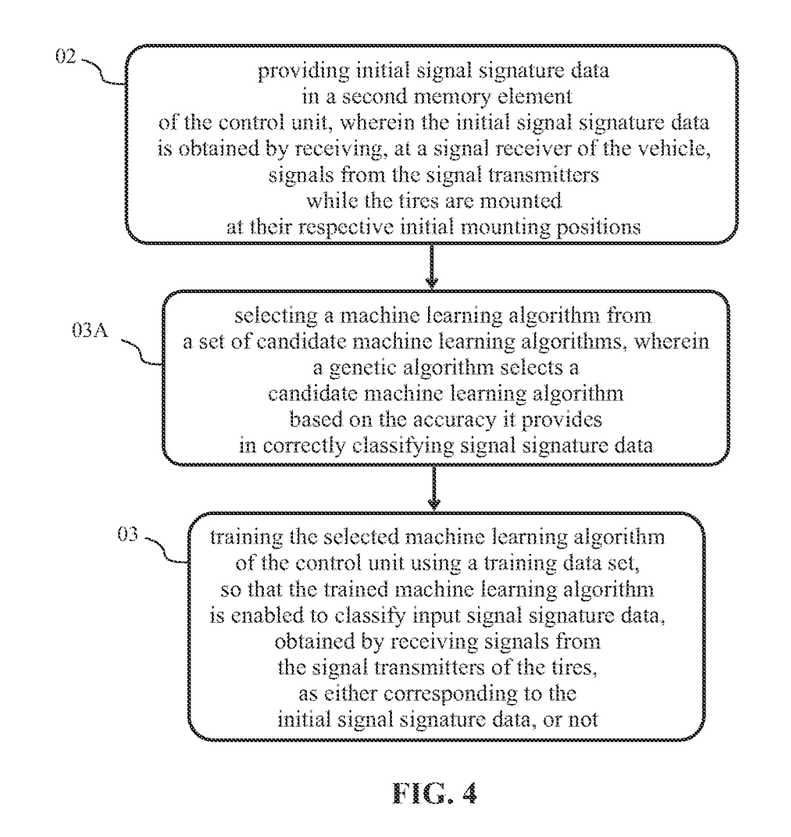
FIG. 4 is a schematic diagram showing detailed aspects of an embodiment of the tire swap detection system in accordance with the present invention.
Figure 5:
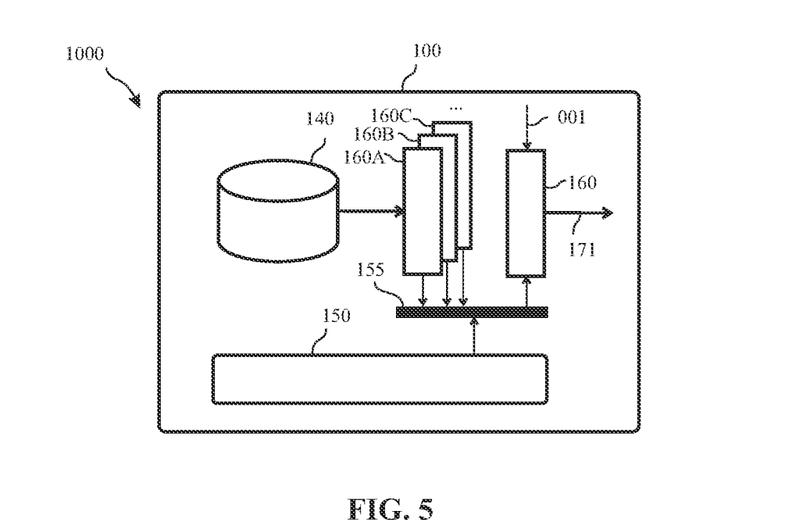
FIG. 5 is a workflow illustrating the main steps of an embodiment of the method in accordance with the present invention.

In accordance with another embodiment of the invention, the previously described method comprises an additional step 03A as illustrated in FIG. 4. The corresponding structure is illustrated in FIG. 5. Prior to classifying yet unknown input signal signature data 001, a set of candidate generic machine learning algorithms 160A, 160B, 160C is provided in a memory element. A larger plurality of machine learning algorithms may be provided, and it is preferred that fifty candidate machine learning algorithms are provided, wherein each machine learning algorithm is a generic classifier as known in the art, having a given number of neural network layers, nodes per layers, interconnections between nodes, etc. The processor 150 then executes a genetic algorithm 155 in order to determine a classifier among the candidates that performs best. By way of example, each of the fifty first-generation candidate machine learning algorithms 160A, 160B, 160C are trained using the training data 140 that has been generated as previously described. Their classification accuracy is then evaluated and the best 20% are retained for evolving into a next generation of candidate machine learning algorithms. A new population of fifty candidate machine learning algorithms of the second generation is generated by recombining features of the retained first generation candidates. This approach may be repeated, by way of a non-limiting example, for 100 generation.

As a result, in the provided example 50 times 100 machine learning algorithms are evaluated and the best becomes the near-optimal trained machine learning algorithm 160 used to classify yet unclassified input signal signature data 001 as previously described.

Figure 6:
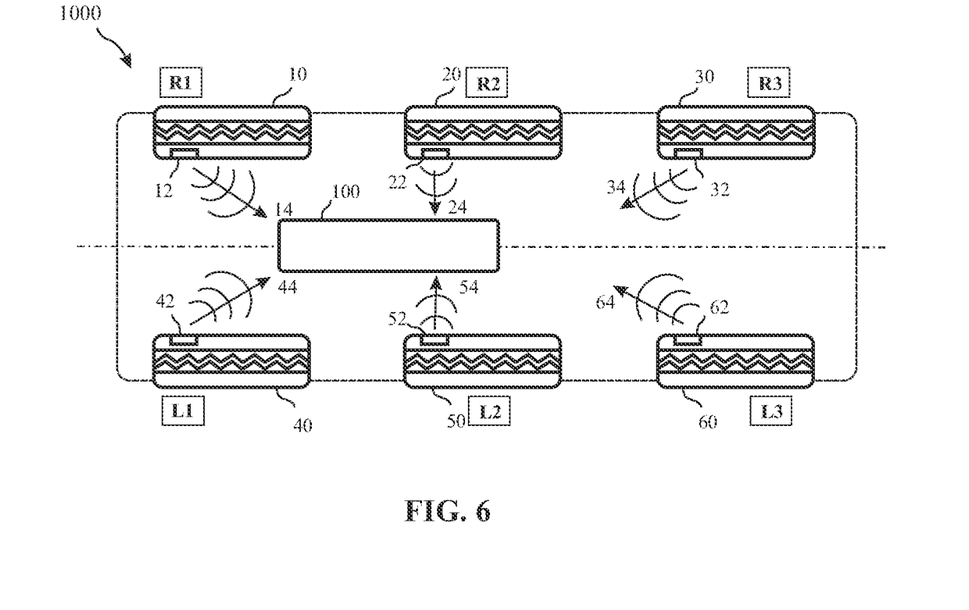
FIG. 6 is a is a schematic diagram showing aspects of an embodiment of the tire swap detection system in accordance with the present invention.

FIG. 6 shows an alternate configuration to the configuration shown in FIG. 2. In FIG. 6, the control unit 100 of the system 1000 is provided closer to the vehicle's front axle than to its rear axle, while it is arranged on a middle longitudinal axis of the vehicle, shown as a dash-dotted line. Such an asymmetrical positioning of the control unit 100 relative to the vehicle's axles may improve the described classification accuracy, as the RSSI levels obtained from the front and rear axle mounted tires will vary more significantly and are thus more clearly discernable by the machine learning algorithm. While in the symmetrical arrangement of FIG. 2, a classification accuracy in the range of 65 to 90% has been observed, the asymmetrical arrangement improved the accuracy by about 10%.

In all the embodiments, the machine learning algorithm may be trained to provide a probability value between 0 and 1 indicating the probability that a swapped tire has been detected, or not. As such, the tire swap detection signal 171 may only be sent by the control unit 100 if the probability that a swapped tire has been detected is larger than a user-defined predetermined threshold probability value.

Similarly, if first detection probabilities obtained by the proposed are low and below a user-defined predetermined threshold probability value, further second detection probabilities from further input signal signature data 001 should be obtained, for example during several more days, and be considered in addition to the first detection probabilities. The probability to accurately detect a swapped tire over n days $p^*$ is indeed given by $p^*=1-(1-p)\hat{}n$, wherein the operator $\hat{}$ means "raised to the power of". Thus, initially low precision is increased by repeated testing.

Virtualization, which is the above-described use of a training data set with matched records and with mismatched records, may desirably reduce issues stemming from insufficient data sets in the detection of tire swap.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A computer-implemented method for detecting a swap of tires on a vehicle including a set of tires mounted in a plurality of available mounting positions of the vehicle, each tire being equipped with a signal transmitter, the method comprising the steps of:
   recording a set of initial mounting positions of the tires in a first memory element of a control unit of the vehicle;
   providing initial signal signature data in a second memory element of the control unit, wherein the initial signal signature data is obtained by receiving, at a signal receiver of the vehicle, signals from the signal transmitters while the tires are mounted at their respective initial mounting positions;
   training a machine learning algorithm of the control unit using a training data set, so that the trained machine learning algorithm is enabled to classify input signal signature data, obtained by receiving signals from the signal transmitters of the tires, as either corresponding to the initial signal signature data, or not;

obtaining input signal signature data at the signal receiver of the vehicle and classifying the input signal signature data using the trained machine learning algorithm;

generating a tire swap detection signal at the control unit if the input signal signature data is classified as not corresponding to the initial signal signature data;

wherein the training data set comprises:
   matched records, in which the initial signal signature data is associated with the set of corresponding initial mounting positions, and
   mismatched records, which are generated by a processor by associating the initial signal signature data with a plurality of sets of mounting positions that differ from the set of initial mounting positions.

2. The computer-implemented method according to claim 1, wherein obtaining the initial signal signature data comprises obtaining statistics of received signal strength indicator (RSSI) levels for each of the received signals over time, while the tires are mounted at their respective initial mounting positions, and wherein the input signal signature data comprises statistics of RSSI levels for the signals received from the signal transmitters of the tires.

3. The computer-implemented method according to claim 2, wherein the statistics of RSSI levels are provided by a set of parameters describing a respectively corresponding RSSI level distribution.

4. The computer-implemented method according to claim 1 wherein training a machine learning algorithm comprises a preliminary step of selecting a machine learning algorithm from a set of candidate machine learning algorithms, wherein a genetic algorithm selects a candidate machine learning algorithm based on the accuracy it provides in correctly classifying signal signature data.

5. The computer-implemented method according to claim 1, wherein the trained machine learning algorithm provides a probability between 0 and 1, wherein the extreme values correspond to the input signal signature data being accurately classified as corresponding to the initial signal signature data, or not.

6. The computer-implemented method according to claim 5, wherein the tire swap detection signal indicates a tire swap if the probability of the input signal signature data being accurately classified as not corresponding to the initial signal signature data is above a predetermined threshold value.

7. The computer-implemented method according to claim 5, wherein more input signal signature data is obtained and classified if the probability of available input signal signature data being accurately classified as not corresponding to the initial signal signature data is below a predetermined threshold value.

8. The computer-implemented method according to claim 1, wherein the tire swap detection signal indicates a tire swap if input signal signature data obtained during a predetermined amount of time is repeatedly classified as not corresponding to the initial signal signature data.

9. The computer-implemented method according to claim 1, wherein the available mounting positions of the vehicle correspond to positions of axles of the vehicle.

10. A tire swap detection system comprising a control unit and a set of tires mounted in a plurality of available mounting positions of a vehicle, each tire being equipped with a signal transmitter, wherein the control unit comprises a signal receiver for receiving signals from the signal transmitters, a first memory element for storing initial mounting positions of the tires and a second memory element for storing initial signal signature data, the initial signal signature data having been obtained by receiving, at the signal receiver, signals from the signal transmitters while the tires are mounted at their respective initial mounting positions, wherein the control unit further comprises a trained machine learning algorithm configured to classify input signal signature data, obtained by receiving signals from the signal transmitters of the tires, as either corresponding to the initial signal signature data or not, and wherein the control unit is further configured to generate a tire swap detection signal if input signature data is classified as not corresponding to the initial signal signature data.

11. The tire swap detection system according to claim 10, wherein the machine learning algorithm has been trained using a training data set comprising:
   matched records, in which the initial signal signature data is associated with the set of corresponding initial mounting positions, and
   mismatched records, which are generated by a processor by associating the initial signal signature data with a plurality of sets of mounting positions that differ from the set of initial mounting positions.

12. The tire swap detection system according to claim 10, wherein the available mounting positions of the vehicle correspond to positions of axles of the vehicle.

13. The tire swap detection system according to claim 10, wherein the control unit is arranged halfway between a front and a rear axle of the vehicle.

14. The tire swap detection system according to claim 10, wherein the control unit is arranged closer to either one of the front or rear axles of the vehicle.

15. The tire swap detection system according to claim 10, wherein the control unit is arranged on a longitudinal middle axis of the vehicle.

16. A control unit for a vehicle, configured to generate a tire swap detection signal, wherein the control unit comprises a signal receiver for receiving signals from signal transmitters of tires, a first memory element for storing initial mounting positions of the tires on the vehicle and a second memory element for storing initial signal signature data, the initial signal signature data having been obtained by receiving, at the signal receiver, signals from the signal transmitters while the tires are mounted at their respective initial mounting positions on the vehicle, wherein the control unit further comprises a trained machine learning algorithm configured to classify input signal signature data, obtained by receiving signals from the signal transmitters of the tires, as either corresponding to the initial signal signature data or not, and wherein the control unit is further configured to generate a tire swap detection signal if input signature data is classified as not corresponding to the initial signal signature data.

17. The control unit in accordance with claim 16, wherein the machine learning algorithm has been trained using a training data set comprising:
   matched records, in which the initial signal signature data is associated with the set of corresponding initial mounting positions, and
   mismatched records, which are generated by a processor by associating the initial signal signature data with a plurality of sets of mounting positions that differ from the set of initial mounting positions.

18. The control unit in accordance with claim 16, the initial signal signature data is obtained by generating, at the control unit, statistics of received signal strength indicator (RSSI) levels for each of the received signals over time, while the tires are mounted at their respective initial mounting positions, and wherein the input signal signature data comprises statistics of RSSI levels for the signals received from the signal transmitters of the tires.

19. The control unit in accordance with claim 18, wherein the generated statistics of RSSI levels are provided by a set of parameters describing a respectively corresponding RSSI level distribution.

20. The control unit in accordance with claim 16, wherein the control unit further comprises a processor configured to select a machine learning algorithm from a set of candidate machine learning algorithms, wherein a genetic algorithm selects a candidate machine learning algorithm based on the accuracy it provides in correctly classifying signal signature data.

\* \* \* \* \*

UNITED STATES PATENT AND TRADEMARK OFFICE
CERTIFICATE OF CORRECTION

Page 1 of 1

PATENT NO. : 12,344,050 B2
APPLICATION NO. : 18/508597
DATED : July 1, 2025
INVENTOR(S) : Dario Torregrossa, Oliviero Truffo and Peter Jung-Min Suh It is certified that error appears in the above-identified patent and that said Letters Patent is hereby corrected as shown below:

On the Title Page

Column 1, item (72), Inventors, for "Oliviero Trufffo", should read --Oliviero Truffo--

Signed and Sealed this
Sixteenth Day of September, 2025

Coke Morgan Stewart
*Acting Director of the United States Patent and Trademark Office*